Patented Nov. 27, 1951

2,576,378

UNITED STATES PATENT OFFICE 2,576,378

CERAMIC DIELECTRICS COMPRISING ESSENTIALLY TITANIA

Jack Woodcock and John Kenneth Paridge, Stourport-on-Severn, England, assignors to Steatite and Porcelain Products Limited, a corporation of Great Britain No Drawing. Application July 20, 1948, Serial No. 39,807. In Great Britain August 6, 1947

7 Claims. (Cl. 106—39)

This invention relates to ceramic dielectrics comprising essentially titania, either uncombined or combined with one or more of the oxides of magnesium, calcium, strontium, or barium.

According to the present invention we provide improved ceramic dielectrics comprising essentially titania and magnesia, and optionally one or more of the alkaline earth oxides, CaO, SrO, and BaO, characterized by the presence therein of thoria and of at least sufficient magnesia to combine with all of the thoria to form from 0.25 to 20% magnesium thorate. Preferably the magnesium thorate content does not exceed 8%, the optimum results being obtained with 1 to 3%.

The magnesium content of the ceramics may greatly exceed the necessary minimum in accordance with the invention, as for example in a ceramic of the ilmenite type in which the major constituent is magnesium titanate. It has not been established definitely that the magnesia and thoria do in fact combine to form magnesium thorate, but since both magnesia and thoria are necessary to obtain the improved bodies, it is assumed without prejudice to the invention that magnesium thorate is present in the fired body.

Bodies in accordance with the invention are produced in the customary way by first preparing a fine-milled powder from which the articles are formed and fired. In preparing the powder the ingredients are wet-mixed, milled with water, dried, and crushed. The powder is then mixed with an organic placticiser, e. g. flour paste, which is subsequently burned out in firing. The plastic mass is shaped by extrusion or other forming processes commonly known in the industry to form tubes, plates, or other articles which after drying out, are fired at a temperature of about 1400° C. or in accordance with the requirements of the particular type body being fired, as will be understood in the industry.

The ingredients from which the bodies are to be produced may be the separate oxides titania, magnesia, and thoria, and other optional oxides, or alternatively some or all of the ingredients may themselves be pre-formed from oxides. Thus a body may be made from titania, magnesia and thoria, or from titania and pre-formed magnesium thorate, or again may be made from titania, alkaline earth oxide, magnesia, and thoria, or from pre-formed alkaline earth titanate, magnesia and thoria, or from pre-formed alkaline earth titanate and magnesium thorate. In place of the respective oxides, any other compound capable of producing or reacting as the oxides during the firing process may be added to the body, as for example the carbonates of magnesium and the alkaline earths. The products preferably comprise the equivalent of 0.22 to 17% by weight of thoria and at least an equimolecular weight of magnesia. This corresponds to a per cent by weight content of from 0.25 to 20% magnesium thorate. Especially desirable is a thoria content between 0.87 and 2.6% and a magnesia content at least stoichiometrically equivalent thereto, i. e., 0.13 to 0.4% by weight, corresponding to a 1 to 3% magnesium thorate content.

Table 1 shows the composition, in terms of oxides present, of a number of ceramic bodies in accordance with and illustrative of our invention, whilst Table 1A shows the nominal composition of the same bodies.

TABLE 1
*Per cent composition as oxides*

| Oxides | Body No. | | | | | |
|---|---|---|---|---|---|---|
| | 1 | 2 | 3 | 4 | 5 | 6 |
| Titania, $TiO_2$ | 97.0 | 49.25 | 35.0 | 32.5 | 30.8 | 70.0 |
| Magnesia, MgO | 0.4 | 50.3 | 0.66 | 0.69 | 1.38 | 4.8 |
| Thoria, $ThO_2$ | 2.6 | 0.45 | 4.35 | 4.31 | 8.62 | 0.2 |
| Calcia, CaO | | | | | | 10.3 |
| Strontia, SrO | | | 15.1 | | | |
| Baria, BaO | | | 44.9 | 62.5 | 59.2 | |

TABLE 1A
*Per cent nominal composition*

| Ingredients | Body No. | | | | | |
|---|---|---|---|---|---|---|
| | 1 | 2 | 3 | 4 | 5 | 6 |
| Titania | 97.0 | | | | | 70.0 |
| Magnesia | | 0.75 | | | | 4.75 |
| Magnesium Thorate, $MgThO_3$ | 3.0 | 0.5 | 5.0 | 5.0 | 10.0 | 0.25 |
| Magnesium Ortho-Titanate, $Mg_2TiO_4$ | | 98.75 | | | | |
| Calcium Titanate, $CaTiO_3$ | | | | | | 25.0 |
| Strontium Titanate, $SrTiO_3$ | | | 26.5 | | | |
| Barium Titanate, $BaTiO_3$ | | | 68.5 | 95.0 | 90.0 | |

Various kinds of bodies falling within the scope of the present invention are represented inter alia by the bodies illustrated in Tables 1 and 1A. Thus body No. 1 is representative of "pure" titania bodies, containing in addition to the titania, only magnesia and thoria in accordance with the invention. Body No. 2 is typical of magnesium titanate bodies improved in accordance with the invention, bodies Nos. 3, 4 and 5 are improved alkaline earth titanate bodies, and body No. 6 is a mixed titania/alkaline earth titanate body. Various other combinations of the oxides shown in Table 1 can also be made in accordance with our invention with the advantages to be derived therefrom.

Table 2 shows the dielectric constants and power factors at room temperature of the bodies enumerated 1-6 in Tables 1 and 1A. The figures in brackets indicate the corresponding electrical properties of other bodies not in accordance with the present invention but of comparable types.

TABLE 2

| Body No. | Dielectric Constant | Power Factor×$10^{-4}$ | |
|---|---|---|---|
| | | 1 Kilocycle | 2 Megacycles |
| 1 | 92 (80-90) | 7 (40-300+) | Less than 1 (3-10). |
| 2 | 16 (12-18) | 6 (10-20) | Less than 1 (2-5). |
| 3 | 420 (11,200) | 20 (70) | |
| 4 | 1040 | 17 | |
| 5 | 410 (1570) | 8 (260) | |
| 6 | 40 (100-130) | 5 (15-40) | 3 (5-12). |

Table 3 indicates the dielectric constants of the alkaline earth titanate bodies 3, 4 and 5 shown in Tables 1, 1A and 2 at low frequency, at various temperatures, and, conjointly with the power factor data given in Table 2, illustrates the improved electrical properties of alkaline earth titanate bodies produced in accordance with our invention as compared with the well-known high-peaking dielectric constant characteristics and higher power factors of the commonly known alkaline earth titanate bodies.

TABLE 3

| Temperature, °C. | Dielectric Constant, 5 volts @ 1 Kc. | | |
|---|---|---|---|
| | Body No. 3 | Body No. 4 | Body No. 5 |
| −40 | | 2,000 | 590 |
| −30 | | 1,800 | 550 |
| −20 | | 1,575 | 510 |
| −10 | | 1,350 | 480 |
| 0 | | 1,250 | 460 |
| 10 | | 1,140 | 435 |
| 20 | 420 | 1,040 | 410 |
| 30 | 383 | 930 | 380 |
| 40 | 351 | 840 | 360 |
| 50 | 325 | | |
| 60 | 305 | 715 | 320 |
| 70 | 290 | | |
| 80 | 280 | 620 | 280 |
| 90 | 276 | | |
| 100 | 279 | 550 | 265 |
| 110 | 291 | | |
| 120 | 309 | 500 | 260 |

The magnesium thorate in ceramics produced in accordance with the invention is poly-functional. It serves as a flux in the firing process, and thus obviates the use of conventional fluxes which have an adverse effect on power factors. Consequently bodies made in accordance with the invention have inherently lower power factors than others fluxed with the conventional fluxes. It is to be understood however that the lower power factors are not attributable solely to the self-fluxing properties of the bodies.

These improved power factors, especially at high frequency, are of primary importance in bodies intended for use at high frequencies at which they are likely to be highly stressed. In the case of bodies comprising mainly or substantially an alkaline earth titanate, such as calcium, strontium and/or barium titanate, the addition of magnesia and thoria in accordance with the invention has the effect of modifying not only their power factors but also their dielectric constant/temperature curves by minimising and/or displacing the peaks on these curves on the temperature scale, thereby enabling closer control of their temperature coefficients.

Good results are obtained when the bodies in accordance with the invention are fired under reducing conditions such as are employed in the firing of hard porcelain. Under such conditions titania normally tends to assume the well-known semi-conducting form, when its dielectric properties are of course greatly impaired, but such tendency is minimised or completely inhibited in the presence of the magnesium thorate.

We claim:

1. A dielectric body constituting the product resulting from the firing of a powdered mixture comprising predominantly titania and containing between 0.22 and 17% by weight of thoria and a quantity of magnesia at least equal to the molecular proportion of the thoria.

2. A dielectric body constituting the product resulting from the firing of a powdered mixture consisting essentially of titania, magnesia and thoria, with the magnesia and thoria being present in equimolecular proportions, the thoria content being between 0.22 and 17% by weight of the mixture.

3. A dielectric body as claimed in claim 1, wherein the quantity of magnesia is in excess of an equimolecular proportion of the thoria.

4. A dielectric body as claimed in claim 1, wherein the thoria content is between 0.87 and 2.6% by weight.

5. A dielectric body as claimed in claim 1, wherein the thoria content is between 0.87 and 2.6% by weight and the magnesia content is between 0.13 and 0.4% by weight.

6. A dielectric body constituting the product resulting from the firing of a powdered mixture comprising titania, magnesia, thoria and at least one alkaline earth oxide from the group consisting of CaO, SrO, and BaO, the alkaline earth oxide content not exceeding the equimolecular equivalent of the titania content, the thoria content being between 0.22 and 17% by weight of the mixture and the magnesia being present in at least an equimolecular proportion to the thoria.

7. A dielectric body as claimed in claim 6, wherein the mixture contains at least about 7% thoria.

JACK WOODCOCK.
JOHN KENNETH PARIDGE.

REFERENCES CITED

The following references are of record in the file of this patent:

UNITED STATES PATENTS

| Number | Name | Date |
|---|---|---|
| 2,398,088 | Ehlers et al. | Apr. 9, 1946 |